(12) United States Patent
Wang et al.

(10) Patent No.: US 9,425,836 B2
(45) Date of Patent: Aug. 23, 2016

(54) ASYMMETRICAL TRANSMITTER-RECEIVER SYSTEM FOR SHORT RANGE COMMUNICATIONS

(71) Applicant: The University of Western Ontario, London (CA)

(72) Inventors: Xianbin Wang, London (CA); Ahmed Rafaey Hussein, London (CA)

(73) Assignee: THE UNIVERSITY OF WESTERN ONTARIO, London, Ontario (CA)

( * ) Notice: Subject to any disclaimer, the term of this patent is extended or adjusted under 35 U.S.C. 154(b) by 2 days.

(21) Appl. No.: 14/136,976

(22) Filed: Dec. 20, 2013

(65) Prior Publication Data
US 2014/0177753 A1    Jun. 26, 2014

Related U.S. Application Data

(60) Provisional application No. 61/739,822, filed on Dec. 20, 2012.

(51) Int. Cl.
| H04K 1/02 | (2006.01) |
| H04L 25/03 | (2006.01) |
| H04L 25/49 | (2006.01) |
| H04B 1/04 | (2006.01) |
| H04W 4/18 | (2009.01) |

(52) U.S. Cl.
CPC .............. *H04B 1/0475* (2013.01); *H04W 4/18* (2013.01)

(58) Field of Classification Search
CPC ..... H04L 1/006; H04L 1/0054; H04L 1/0065; H04L 1/0071; H04L 1/0041
USPC .................. 375/219–236, 259–352, 355–376
See application file for complete search history.

(56) References Cited

U.S. PATENT DOCUMENTS

| 5,268,927 | A | * | 12/1993 | Dimos | H04B 1/7101 375/147 |
| 5,978,365 | A | * | 11/1999 | Yi | H03M 13/6381 370/331 |
| 7,907,555 | B1 | * | 3/2011 | Sankabathula | H04W 52/0245 370/284 |
| 8,355,466 | B2 | * | 1/2013 | Kleider | H03F 1/3294 375/295 |
| 8,619,910 | B1 | * | 12/2013 | Lee | H04L 25/03057 370/334 |
| 2003/0058955 | A1 | * | 3/2003 | Raghavan | H04L 27/2601 375/265 |
| 2004/0101032 | A1 | * | 5/2004 | Dabak | H04B 1/7093 375/143 |
| 2006/0133338 | A1 | * | 6/2006 | Reznik | H04L 27/3477 370/338 |
| 2006/0274715 | A1 | * | 12/2006 | Hahm | H04L 1/0051 370/349 |
| 2006/0285604 | A1 | * | 12/2006 | Walton | H04L 1/0002 375/267 |
| 2008/0075149 | A1 | * | 3/2008 | Botha | H04B 1/70735 375/148 |
| 2008/0130777 | A1 | * | 6/2008 | Landau | H04B 1/7105 375/267 |

(Continued)

*Primary Examiner* — James M Perez
(74) *Attorney, Agent, or Firm* — Brion Raffoul

(57) ABSTRACT

Systems, methods, and devices relating to short range wireless communications. A host device wirelessly communicates with a user device. The transceiver on the host device is of a greater complexity than the transceiver on the user device. The host device performs a number of signal processing steps on data to be exchanged with the user device such that the complexity of the processing to be done by the user device is significantly reduced. This approach thereby reduces the complexity of the transceiver on the user device. The host device processing includes pre-channel equalization and pre-synchronization.

31 Claims, 9 Drawing Sheets

(56) References Cited

U.S. PATENT DOCUMENTS

| | | | | |
|---|---|---|---|---|
| 2009/0022242 | A1* | 1/2009 | Waters | H04L 1/0041 375/299 |
| 2009/0028115 | A1* | 1/2009 | Hirsch | G06Q 10/0637 370/337 |
| 2009/0201860 | A1* | 8/2009 | Sherman | H04L 12/1881 370/329 |
| 2009/0219851 | A1* | 9/2009 | Abraham | H04L 1/1812 370/315 |
| 2009/0232234 | A1* | 9/2009 | Du | H04B 7/2621 375/260 |
| 2010/0002692 | A1* | 1/2010 | Bims | H04L 1/0009 370/389 |
| 2010/0068993 | A1* | 3/2010 | Khan | H04B 7/1853 455/12.1 |
| 2010/0158145 | A1* | 6/2010 | Cho | H04L 1/0643 375/260 |
| 2010/0272168 | A1* | 10/2010 | Chappaz | H04L 1/0625 375/232 |
| 2011/0075745 | A1* | 3/2011 | Kleider | H04L 25/03057 375/260 |
| 2011/0274021 | A1* | 11/2011 | He | H04W 52/0238 370/311 |
| 2011/0299442 | A1* | 12/2011 | Nammi | H04L 1/1829 370/310 |
| 2012/0155347 | A1* | 6/2012 | Husted | H04W 52/0229 370/311 |
| 2012/0263090 | A1* | 10/2012 | Porat | H04L 1/0003 370/312 |
| 2013/0051496 | A1* | 2/2013 | Li | H04B 1/28 375/334 |
| 2013/0188567 | A1* | 7/2013 | Wang | H04L 5/0094 370/329 |
| 2014/0126435 | A1* | 5/2014 | Soliman | H04W 72/0453 370/280 |
| 2014/0286455 | A1* | 9/2014 | Choi | H04L 5/0048 375/308 |
| 2014/0328430 | A1* | 11/2014 | Park | H04L 25/0224 375/295 |
| 2015/0071270 | A1* | 3/2015 | Harel | H04W 72/0413 370/338 |
| 2015/0282068 | A1* | 10/2015 | Rajagopal | H04W 52/0206 370/350 |

* cited by examiner

ASYMMETRICAL TRANSMITTER-RECEIVER SYSTEM FOR SHORT RANGE COMMUNICATIONS

TECHNICAL FIELD

The present invention relates to the design of wireless communications systems. More specifically, the present invention relates to an asymmetric communications scheme which uses a complex host transceiver architecture in conjunction with a simpler user transceiver architecture.

BACKGROUND OF THE INVENTION

Short-distance wireless communications, which can often provide extremely high data rate over several hundred Mbps, is set to become a key enabling technology for many exciting applications in the very near future. With the available high data rate, short range communication devices will offer ease of use of many consumer electronic devices by eliminating the need for the cumbersome interconnecting cables under various scenarios. Typical emerging applications based on short range high speed communications includes wireless HDMI, wireless USB, wireless printing, device-to-device communications, machine to machine communications, small cell communications etc.

However, most emerging short range wireless applications rely on high speed communications. For instance, video streaming of raw decompressed HD video may need a data rate of around 1 Gbs. Such high data rates significantly increase the complexity and cost of wireless transceivers designed using traditional technologies. The high cost of the user devices will eventually limit the potential applications of short range wireless communication, mainly due to the existence of the competing wired solutions for short range communications (i.e., various cabling technologies). In conjunction with the increasing complexity of high speed user devices, most short range applications often feature a host device with fast computing capabilities, for example a computer.

Existing solutions for short range wireless communications technologies and their corresponding standards are characterized by the following difficulties:

1) Symmetrical design for master (host) and slave devices (user devices). Such a symmetrical design approach drastically increases the unit price of the user device. This is because of the complex and high speed digital signal processing algorithms for channel equalization, compensation and synchronization needed on the user device to support the high speed communications. At the same time, the precision of the digital signal processing modules needs to be very high due to weak signal strengths. The weak signal strength stems from low transmission power in unlicensed broadband communications.

2) The extremely high data rate (>1 Gbps) and the signal processing needed to support such high rates also tend to increase the power consumption and the die area of the user devices. Unfortunately, these current user devices are also reliant on battery power supplies with a limited capacity. The battery requirements will significantly increase the size and weight of the wireless user devices using conventional designs.

3) The complex network protocol for existing short range wireless communications also needs a DSP processor to handle the upper layer interactions and resource management. This further increases the cost of the user devices.

Within many consumer electronics applications, the signal processing capabilities of the devices using the short range communications are not symmetrical. As an example, a desktop computer may be used as a host of the short range communications. This desktop computer can have much a faster processing speed than a user device, for example a camera equipped with a wireless USB interface for data transfers. Due to the extremely high transmission rates (e.g. over several hundred Mbps) required by multimedia applications, implementing a symmetrical design approach for consumer electronics products will significantly increase the cost of such devices and will correspondingly reduce their technology competitiveness.

Hosts for short range communications (e.g. a desktop computer) are often used as a hub (server) for many short range wireless user devices. For instance, a desktop computer can be used to interact with many different short range wireless devices, such as a HD video streaming or data exchange with a printer/camera. To render the costs affordable to the consumer for such technologies, reducing the implementation cost of the mobile devices would by very important. Such lowering of implementation costs can stimulate and help the growth and development of this emerging market.

There is therefore a need for methods and systems which mitigate if not overcome the issues associated with the prior art. Technologies which can lower implementation costs for short range, high speed wireless communications between devices are therefore desired.

SUMMARY OF INVENTION

The present invention provides systems, methods, and devices relating to short range wireless communications. A host device wirelessly communicates with a user device. The transceiver on the host device is of a greater complexity than the transceiver on the user device. The host device performs a number of signal processing steps on data to be exchanged with the user device such that the complexity of the processing to be done by the user device is significantly reduced. This approach thereby reduces the complexity of the transceiver on the user device. The host device processing includes pre-channel equalization and pre-synchronization.

The objective of the present invention is to significantly reduce the cost of the user devices for short range wireless communications through an asymmetrical transceiver design. The design of host device for short range communications will provide additional signal processing including pre-channel equalization and pre-synchronization and should significantly reduce the complexity of the corresponding user devices.

Since power consumption as well as die area must be minimized for user devices, other enhancements are introduced by exploiting the complexity difference between encoding and decoding processes. Error correction codes with asymmetrical encoder and decoder complexities are introduced to simplify the user device. Thus efficient VLSI implementations of two powerful iterative error correcting codes with respect to power, area, and throughput are critical for these mobile devices implementations.

The architecture for the error correcting coding and decoding techniques is based on selecting an uplink error correcting code for the uplink (from user device to host device) communications with a low encoder complexity at the user device side and a powerful decoder with a higher complexity at the host device side. However, the opposite case is operative for a downlink error correcting code. The downlink error correcting code for the downlink communication process from the host device to the user device is preferably one with a low decoder complexity at the user device side and a higher encoder complexity at the host device side.

One result of the present invention is that the complexity of the user device transceiver is reduced to some simple logic operations with extremely low implementation cost.

In a first aspect, the present invention provides a method for asymmetrical wireless communications between a host device and a user device, the method comprising:
a) receiving a preamble transmission from a transmitter of said user device, said preamble transmission containing a predetermined preamble from said user device;
b) determining communications parameters for a channel used in communicating between said host device and said user device, said communications parameters being determined by a receiver on said host device using said preamble;
c) receiving the data to be transmitted from said host device to the said user device;
d) applying a downlink error correcting code to said data;
e) applying at least one pre-transmission process to said data to result in pre-processed data, said at least one pre-transmission process being for compensating for potential distortions due to said channel;
f) transmitting said pre-processed data to said user device;
wherein said downlink error correcting code applied to said data for transmission from said host device to said user device is different from an uplink error correcting code applied to data for transmission from said user device to said host device, said downlink error correcting code having a high encoder complexity and a low decoder complexity than said uplink error correcting code.

In a second aspect, the present invention provides a method for asymmetrical wireless communications between a host device and a user device, the method comprising:
a) determining a transmission time between said user device and said host device based on an instruction from said host device to said user device;
b) receiving data to be transmitted from said user device to said host device;
c) applying an uplink error correcting code to said data;
d) transmitting said data from a user device transmitter to a host device receiver;
wherein
said uplink error correcting code applied to said data for transmission from said user device to said host device is different from a downlink error correcting code applied to data for transmission from said host device to said user device, said uplink error correcting code having a lower encoder complexity and a higher decoder complexity than said downlink error correcting code.

In a third aspect, the present invention provides a system for use in short range wireless communications, the system comprising:
a host device having a host transmitter and a host receiver;
a user device having a user transmitter and a user receiver;
wherein
said host transmitter transmits to said user receiver by way of a specific channel using a downlink error correcting code;
said user transmitter transmits to said host receiver by way of said specific channel using an uplink error correcting code;
said uplink error correcting code is different from said downlink error correcting code;
said host transmitter applies at least one pre-transmission process to data to be transmitted to said user device to result in pre-processed data, said at least one pre-transmission process being for compensating for potential issues due to said specific channel.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
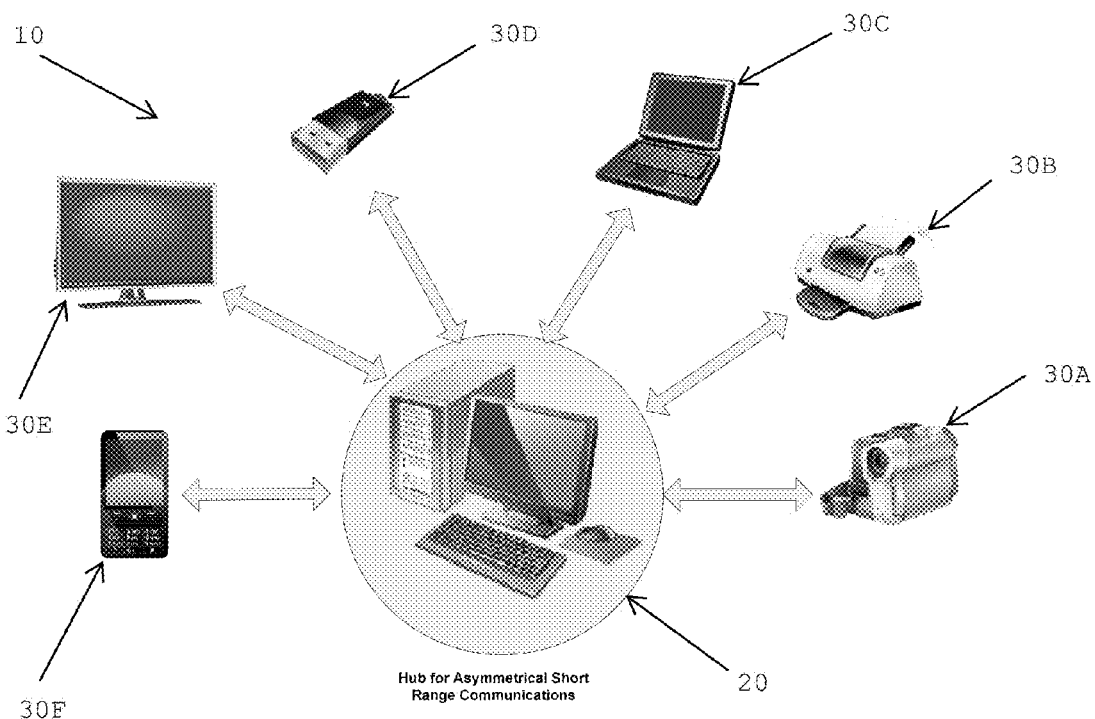
FIG. 1 is a block diagram of an example of a short range wireless communications system.

Referring to FIG. 1, a block diagram of an exemplary short range wireless communications system is illustrated. As can be seen from FIG. 1, the system 10 has a hub 20 which communicates with multiple devices 30A . . . 30F. In one implementation of the invention, the hub 20 would have a more complex transceiver than the transceivers for user devices 30A . . . 30F. The hub would perform more pre-processing on data to be exchanged with the user devices, thereby reducing the complexity of the transceivers for the user devices 30A . . . 30F.

Figure 2:
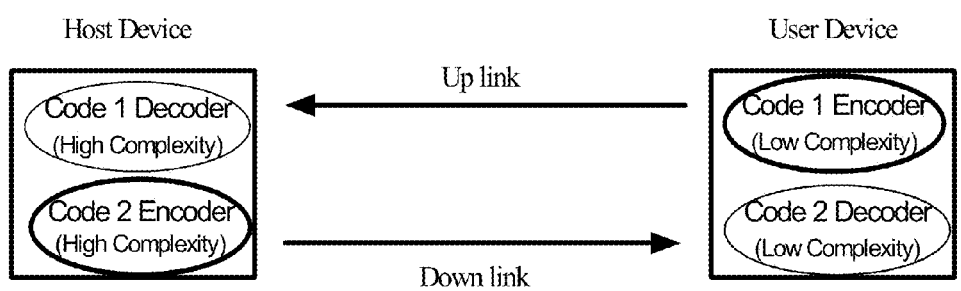
FIG. 2 is a diagram illustrating an asymmetrical forward error correction structure according to one aspect of the invention

Referring to FIG. 2, a block diagram illustrating the concept behind the present invention is provided. The present invention provides a host device that has a high complexity decoder and encoder. This allows the user device to have a lower complexity encoder and decoder. Two codes are therefore required to communicate between the host device and the user device. The uplink error correcting code, for the uplink where the user device is transmitting to the host device, therefore uses a low complexity encoder while using a high complexity decoder. For the downlink error correcting code where the host device is transmitting to the user device, the downlink error correcting code uses a high complexity encoder and a low complexity decoder.

Figure 3:
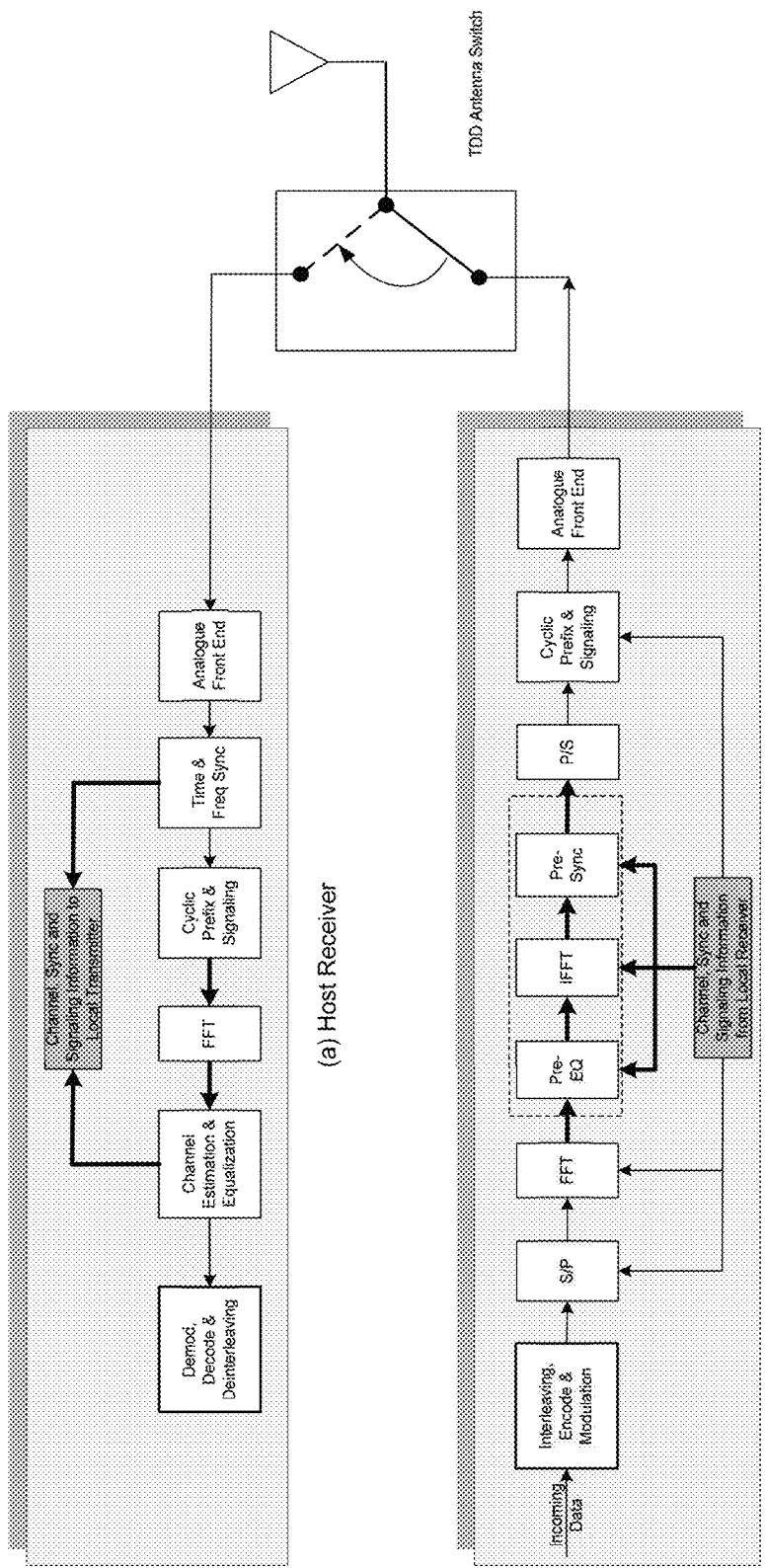
FIG. 3 is a block diagram of a host device for short range communications according to one aspect of the invention.
Figure 4:
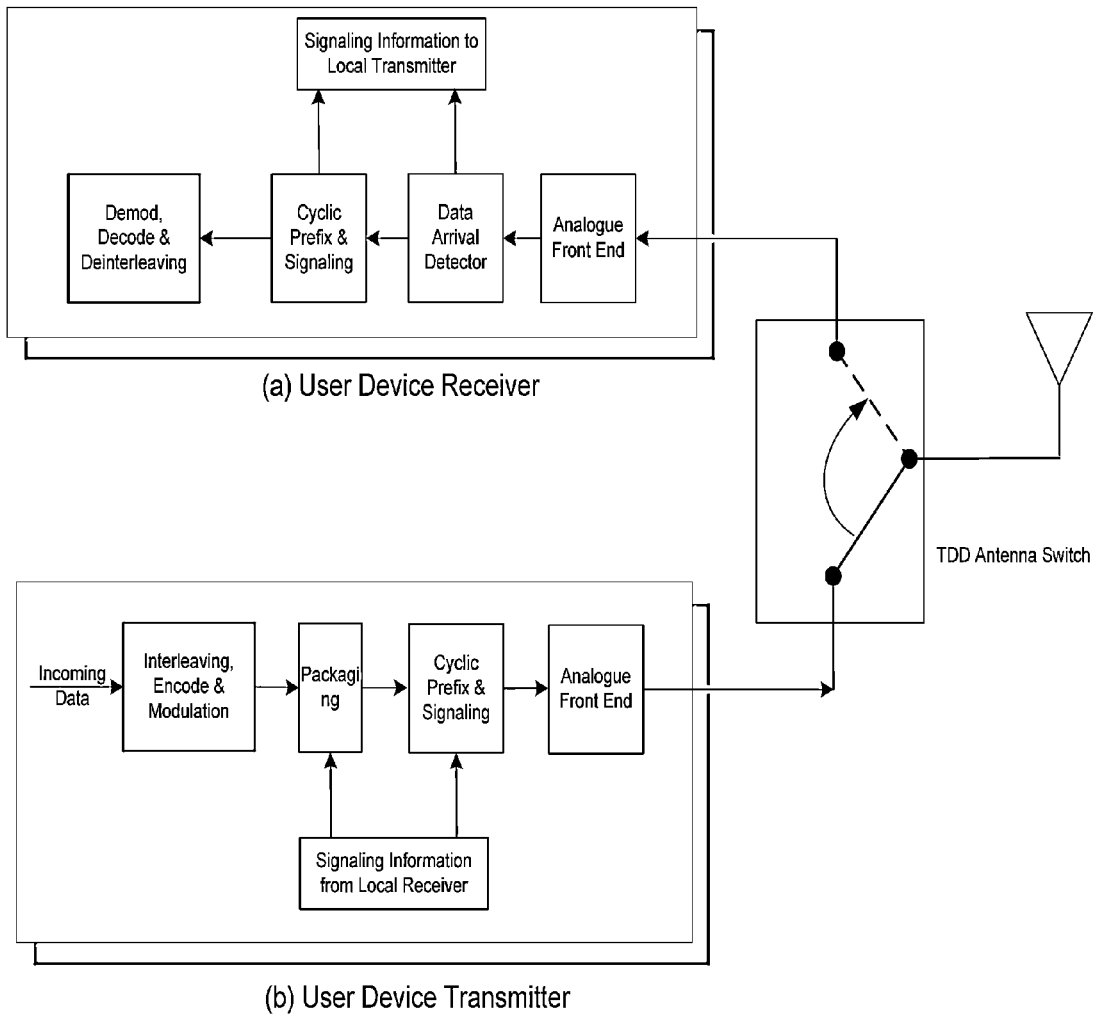
FIG. 4 is a block diagram of a user device for short range communications according to another aspect of the invention.
Figure 5:
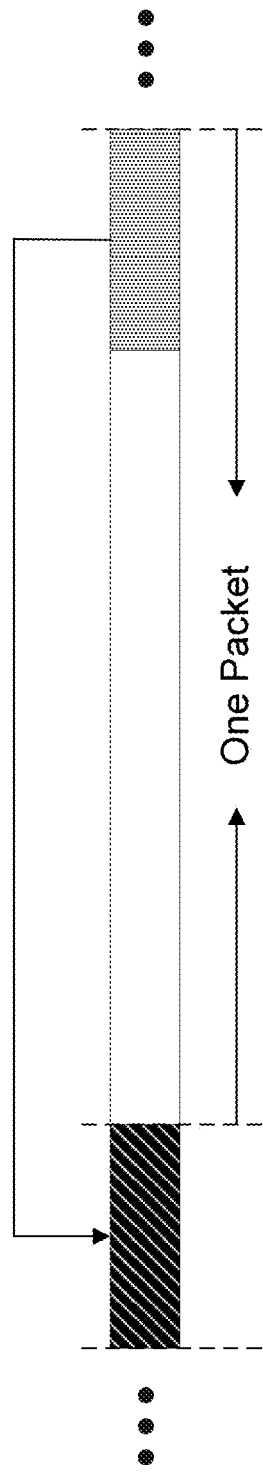
FIG. 5 is an illustration of a packet data frame structure which may be used with the present invention.
Figure 6:
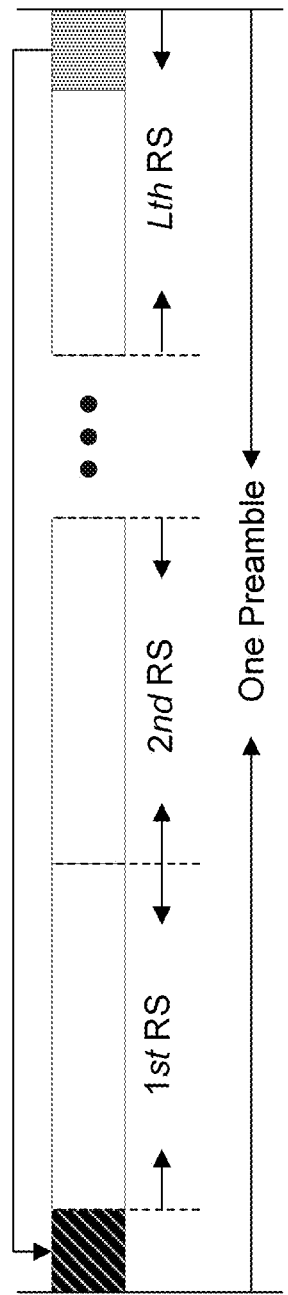
FIG. 6 is an illustration of a packet preamble structure which may be used with the present invention.

Referring to FIG. 3, a block diagram of the host device according to one aspect of the invention is illustrated. The components in the diagram will be explained below. Referring to FIG. 4, a block diagram of the user device according to another aspect of the invention is illustrated. Again, the components in this diagram will be explained below. FIG. 5 illustrates the packet data frame structure for use with the invention while FIG. 6 illustrates the preamble structure for this data frame structure. As noted above, the host and user devices have different transceiver designs, with the host device performing most of the pre-processing on behalf of mobile devices. This pre-processing includes pre-equalization and pre-synchronization.

As another aspect of the invention, it has been observed that, when comparing turbo codes and LDPC (Low Density Parity Check) codes, encoders for turbo codes are much better than LDPC encoders in terms of complexity. However, when reviewing the decoder, LDPC decoders are much simpler than decoders for turbo codes. Based on these results, turbo codes are to be used as the uplink error correcting code (i.e. code 1 for the uplink or for transmissions from the user device to the host device) while LDPC codes are to be used as downlink error correcting code (i. e. code 2 for the downlink or for transmissions from the host device to the user device).

The data exchange between the host and the user devices is achieved using time division duplex (TDD) block communications. With TDD based channel sharing between the uplink and downlink, channel reciprocity can be realized between the uplink and downlink channels. As a result, the host transmitter can perform the pre-equalization and pre-synchronization based on the channel estimation and carrier frequency offset obtained by the host receiver during the signal reception process.

The following data block structure with N modulated data symbols for the l-th block is used for the communications between the host and user devices, as shown in the following equation:

$$s_l = [\underbrace{x_l(N-P+1), \ldots, x_l(N-1)}_{prefix}, \underbrace{x_l(0), \ldots, x_l(i), \ldots, x_l(N-1)}_{N\ data\ symbols}]^T. \quad (1)$$

The modulated data symbols in the l-th data block in equation (1) are obtained by modulating and encoding the incoming data using the selected digital modulation scheme and error correcting code, depending on the parameters used for uplink or downlink transmissions. The selected digital modulation technique can be chosen from all conventional digital modulation techniques including single carrier modulation and multi-carrier modulation techniques. The selected error correcting code is determined by the particular direction of the transmission, i.e. uplink or downlink.

As a result of equation (1), a redundant cyclic prefix of P symbols is inserted before the transmission of N data symbols to protect the symbol for the potential distortion from the dispersive channel.

The considerations to be addressed with regard to the host receiver will be detailed below.

The received signal $r_l$ corresponding to the above transmitted signal vector in (1) from the remote user device can be expressed as $$r_l = \Gamma(\Delta k) h \cdot s_l + w \quad (2)$$

where the channel matrix is $$h = \begin{bmatrix} h_0 & 0 & \cdots & & \cdots & 0 \\ h_1 & h_0 & & & \ddots & \vdots \\ \vdots & \ddots & \ddots & \ddots & & \vdots \\ h_{P-1} & \cdots & h_1 & h_0 & \ddots & \vdots \\ 0 & \ddots & & \ddots & \ddots & 0 \\ \vdots & & h_{P-1} & \cdots & h_1 & h_0 \\ \vdots & & & \ddots & h_{P-1} & \cdots & h_1 \\ \vdots & \ddots & & & \ddots & \vdots \\ 0 & \cdots & \cdots & \cdots & 0 & h_{P-1} \end{bmatrix}$$

with size of [N+2P,N+P]. w is an additive white Gaussian noise (AWGN) vector with the same size as $s_l$. $\Delta k$ represents the relative frequency offset between the remote transmitter and local receiver. $\Gamma(\Delta k)$ is a diagonal matrix which represents the impact of the carrier frequency offset on the received signal and is defined by:

$$\Gamma(\Delta k) = \text{diag}\{1, e^{j2\pi\Delta k/N}, e^{j4\pi\Delta k/N}, \ldots, e^{j2\pi(N+2P-1)\pi k/N}\} \quad (3)$$

Regarding compensating for a carrier frequency offset, one can start by assuming a perfect estimation of a frequency offset. If one assumes a perfect carrier frequency offset estimation, the following matrix is first applied to the received signal to remove the impact of the carrier frequency offset.

$$64'(-\Delta k) = \text{diag}\{1, e^{-j2\pi\Delta k/N}, e^{-j4\pi\Delta k/N}, \ldots, e^{-j2\pi(N+2P-1)\Delta k/N}\} \quad (4)$$

One can then use the following expression for the received signal after mitigation of the carrier frequency offset:

$$r_l' = \Gamma(-\Delta \hat{k}) r_l \quad (5)$$

As noted above, part of the invention is that of compensating for channel distortions. After synchronization and CP (cyclic prefix) removal (the tilde indicates the synchronization and removal of CP), the received signal $\tilde{r}_l$ is actually the cyclic convolution between $\tilde{s}_l$ and channel impulse response h when the AWGN noise is neglected. The following discrete Fourier transformation (DFT) pair holds $$\tilde{s}_l \otimes h + \tilde{w} \Leftrightarrow DFT(\tilde{s}_l) \cdot H + \tilde{W} \quad (6)$$

where $\otimes$ denotes the cyclic convolution while H and $\tilde{W}$ are the Fourier transform of h and $\tilde{w}$. The size of DFT here is N points.

Assuming that the channel transfer function H in the frequency domain is known from channel estimation, channel impairments can be compensated with the expression in Equation (6) using a one-tap frequency domain equalizer. For the demodulation of each data block in the same frame, the equalized frequency domain signal has to be converted back into the time domain for the inverse DFT demodulation. Note the left hand side of (6) represents the unequalized signal, $\tilde{r}_l$. The equalization process can be formulated as $$\tilde{r}_l^{FEQ} = IDFT\left\{\frac{DFT(\tilde{r}_l)}{H}\right\} + \tilde{w}_l^{FEQ} \quad (7)$$

where $\tilde{w}_l^{FEQ}$ is the AWGN noise after the equalization process. The equalized signal in time domain, $\tilde{r}_l^{FEQ}$, is then split into N symbols for demodulation.

It should be noted that channel estimation and synchronization will be discussed below separately after the structures of the transceiver structures have been described.

From the above, the host device also includes an optimized combined compliant turbo codes decoder for its receiver and an LDPC encoder for its transmitter. The architecture for the turbo decoder can support an MAP or SOVA component decoder. However, it has been found that a solution based on MAP component decoder using the pipeline architecture is preferable. Furthermore, it has been found that the LDPC codes encoder based on the pipeline parallel approach is also preferable.

The above approach opens the possibility of a unified architecture by merging the pipelined MAP decoder noted above with the LDPC encoder pipelined parallel architecture. However, this decoder and this encoder differ substantially in terms of their memory requirements and branch-metric calculations (due to the different code structures). Since the branch-metric calculation units (BMU) are of less complexity, and therefore require less area, separate BMUs can be implemented. For the high throughput requirements, forward and backward recursions can be calculated in parallel on the same hardware unit, the state metric unit or SMU.

Figure 7:
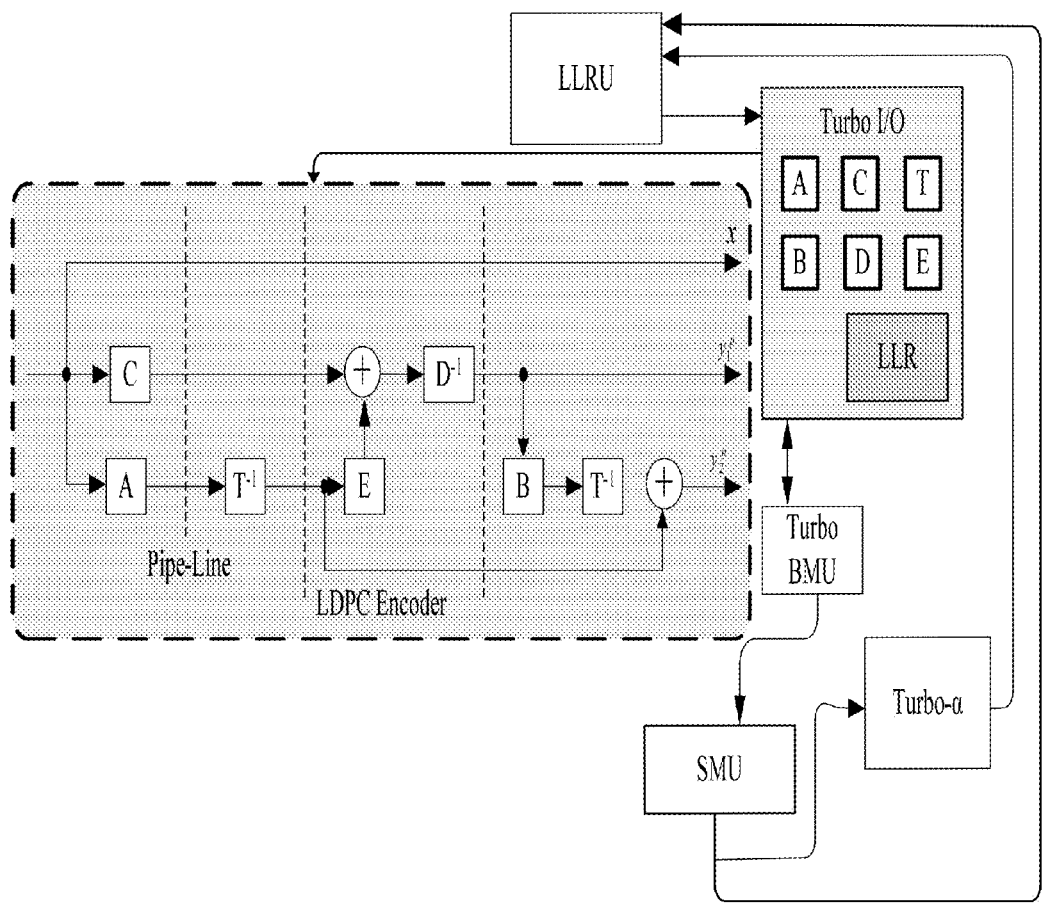
FIG. 7 is a block diagram of a combined turbo decoder/ LDPC encoder architecture for use with a host device according to another aspect of the invention.

Referring to FIG. 7, a block diagram of a combined turbo decoder/LDPC encoder for a host device is illustrated.

In practice, only a single set of multiplexers has to be added to the SMU due to the efficient data ordering and the optimized memory organization. Hence, the critical path is not significant altered. The LLR (log likelihood ratio) values are calculated in a dedicated unit (log likelihood ratio unit or LLRU) which consists of two pipelined trees which perform additions, comparisons and subtractions.

The LLR calculation is performed in the same loop as the backward recursion. Thus, only the alpha values have to be stored in memory alpha-RAM whereas the beta-values are directly consumed after calculation. The size of the alpha-RAM is determined by the block size. Furthermore, the well-known sliding window approach allows for the significant reduction of this memory at the cost of some additional computations (acquisition phase). To be more precise, a window size of 64 was found to be a good trade-off between computational overhead and memory size.

Parts of the pipeline tree of the turbo code LLRU can be used for the LDPC codes encoder as well. Accordingly, some of the computational hardware can be reused for the decoder/encoder. Nevertheless, the whole architecture illustrated in FIG. 7 is dominated by memory. Therefore, an efficient memory partitioning is essential for architectural efficiency. Following the architecture given in FIG. 7, the turbo decoder is dominated by the I/O memory due to the large block sizes. The alpha-RAM is of negligible size. It should be noted that the architecture illustrated in FIG. 7 is a generalized architecture. For specific implementations, it should be noted that memories which store the same amount of data or the same data can be merged.

As noted above, the turbo decoder is used in the host device receiver while the LDPC encoder is used the host device transmitter. More details regarding the host transmitter is provided below.

The design of the host transmitter provided below forms part of the invention as the asymmetrical processing is achieved mostly at the host transmitter side. The main goal of the asymmetrical design is the reduction in complexity for the remote user receiver through pre-equalization and pre-synchronization performed at the host side. That is, pre-equalization and pre-synchronization will compensate for channel distortion from the signal propagation environment and clock drifting from the remote receiver. Because of these, the remote user receiver does not need any complex signal processing to compensate for the non-flat channel and carrier frequency offset.

For the host device transmitter, one can consider the following data packet to be transmitted from the host device transmitter the user device receiver, $$x_l = [\underbrace{x_l(0), \ldots, x_l(i), \ldots, x_l(N-1)}_{N \text{ data symbols}}]^T. \tag{8}$$

The transmission of the data block in (8) can be self-initiated by the host device according to a high layer network protocol. Alternatively, the data block transmitted in response to a request from the user device under predetermined interaction mechanism.

The modulated data symbols in equation (8) are obtained by modulating and encoding the incoming data using the selected digital modulation scheme and error correcting code for the downlink transmission.

The host device transmitter will also need input from host receiver in completing the preprocessing used by the asymmetrical communication process. The host receiver will estimate the channel impulse response and the carrier frequency offset and will further send these estimates to the host device transmitter. The host receiver estimates the channel impulse response and carrier frequency offset based on a preamble transmission (containing a preamble) received from the user device transmitter.

In the asymmetrical host transmitter, two additional processing functions are introduced to the transmitter, i.e., pre-equalization and pre-synchronization. Note the channel estimate and carrier frequency offset used here in the pre-processing will be provided by the local host receiver, which does not require need any additional processing.

For pre-synchronization, the data block to be transmitted in (8) will be further processed to compensate the potential carrier frequency offset (CFO) at the remote receiver side. Note the CFO used in the following pre-synchronization is from the local host receiver. The expression below represents the pre-synchronized data packet to be transmitted to the host receiver:

$$\tilde{x}_l^{SYN} = \Gamma'(-\Delta k)x_l \tag{9}$$

where $$\Gamma'(-\Delta k) = \text{diag}\{1, e^{-j2\pi\Delta k/N}, e^{-j4\pi\Delta k/N}, \ldots e^{-j2\pi(n-1)\pi k/N}\} \tag{10}$$

For pre-equalization, this pre-equalization will be achieved in the frequency domain. For this purpose, the data symbols (see Equation (8)) to be transmitted will first be converted into the frequency domain, $$X_l^{SYN}(k) = \frac{1}{\sqrt{N}} \sum_{k=0}^{N-1} x_l^{SYN}(n) e^{j2\pi \frac{nk}{N}} \tag{11}$$

where k=0, 1, 2, ..., N−1.

The pre-equalization is achieved through the following equation $$\tilde{x}_l^{PEQ} = IDFT\left\{\frac{X_l^{SYN}}{H}\right\} \quad (12)$$

The eventual signal to be transmitted by the host transmitter to the user device, which corresponds to the representation in Equation (8), thus becomes $$s_l = [\underbrace{\tilde{x}_l^{PEQ}(N-P+1), \ldots, \tilde{x}_l^{PEQ}(N-1)}_{prefix}, \underbrace{\tilde{x}_l^{PEQ}(0), \ldots, \tilde{x}_l^{PEQ}(i), \ldots, \tilde{x}_l^{PEQ}(N-1)}_{N \text{ data symbols}}]^T. \quad (13)$$

For the user device receiver, one must take into account that the transmitted signal from the host device (see Equation (13)) will experience the channel distortion and local carrier frequency offset during the communications process. The received signal corresponding to the above transmitted signal vector in (13) from the remote user device can be expressed as $$r_l = \Gamma(\Delta k)h\tilde{x}_l^{PEQ} + w \quad (14)$$

where $\tilde{x}_l^{PEQ} = h^{-1}\Gamma(-\Delta k)x_l$. In (14), $h \cdot h^{-1} = 1$ when the pre-synchronization is achieved at the host transmitter side.

After CP removal, the received signal $\tilde{r}_l$ (the tilde indicates removal of the cyclic prefix or CP) is actually the cyclic convolution between the pre-equalized signal in Equation (13) and the channel impulse response h when the AWGN noise is neglected. The following DFT transform pair holds $$\tilde{x}_l^{PEQ} \otimes h + \tilde{w} \Leftrightarrow DFT(\tilde{x}_l^{PEQ}) \cdot H + \tilde{W} \quad (15)$$

where $\otimes$ denotes the cyclic convolution while H and $\tilde{W}$ are the Fourier transform of h and $\tilde{w}$. Note that the size of DFT here is N points. The DFT expression above equates to:

$$DFT(\tilde{x}_l^{PEQ}) \cdot H = \frac{X_l^{SYN}}{H}H = X_l^{SYN} \quad (16)$$

Equation (16) shows that the remote receiver does not have to perform any equalization related processing. The channel distortion will be offset by the pre-equalization at the host transmitter side. Equation (14) can be rearranged as $$r_l = \Gamma(\Delta k)x_l^{SYN} + w \quad (17)$$
$$= \Gamma(\Delta k)\Gamma'(-\Delta k)x_l + w$$

In Equation (17), we have $r(\Delta k) \cdot \Gamma'(-\Delta k) = I$, when the perfect pre-synchronization is achieved at the host transmitter side.

Consequently the following results can be obtained at the receiver of the user device:

$$r_l = x_l + w \quad (18)$$

The significance of equation (18) is that the received signal at the user device does not need equalization and synchronization when the host transmitter has performed the pre-equalization and pre-synchronization.

Figure 8:
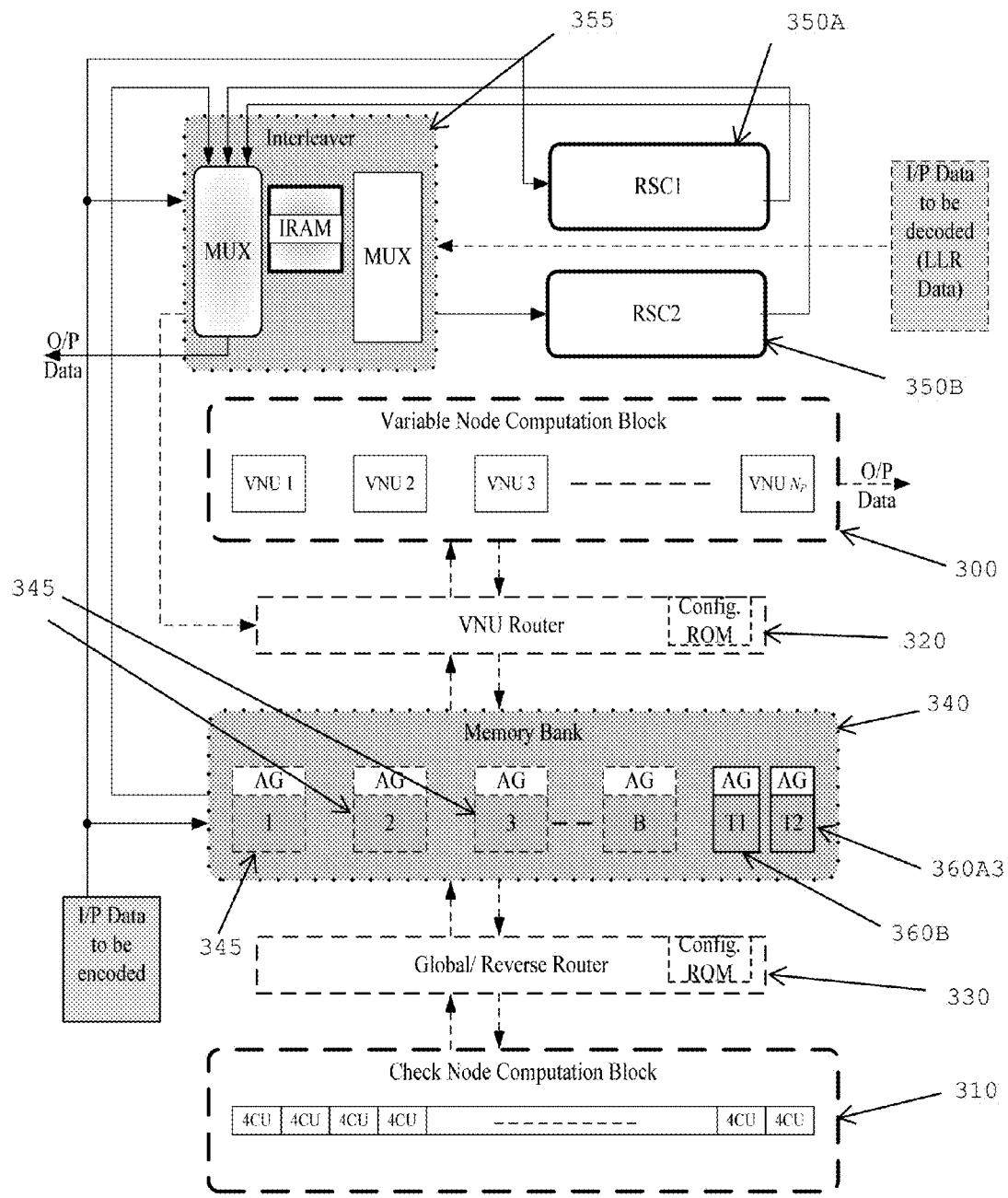
FIG. 8 is a block diagram of a combined LDPC decoder/ turbo encoder architecture for use with a user device according to another aspect of the invention.

Referring to FIG. 8, a block diagram of the combined LDPC decoder/turbo encoder architecture for a user device according to one aspect of the invention is illustrated. In FIG. 8, the dashed lines and boxes are the LDPC decoder hardware, the solid lines and boxes are the turbo encoder hardware, and the shadow boxes are the shared resources. It should be noted that the turbo encoder hardware will be described in the section discussing the user device transmitter.

In such LDPC decoder structures, a certain number of check and variable nodes are mapped to a hardware unit in a time division multiplexing mode. This can relieve the challenge of routing congestion and can improve the decoding throughput.

The partially parallel architecture of an H matrix of size M×N is shown in FIG. 8. It consists of three main parts: an array of $N_v$ variable node processing unit (VNU) blocks 300, an array of $M_c$ check node processing unit (CNU) blocks 310, and a routing network 320 for the VNUs and a routing network 330 for the CNUs. Also part of the architecture is a memory bank 340 that is capable of parallel loads and parallel outputs to either or both the routing networks 320, 330. Every VNU contains a variable node computation core and a memory storing L exchanged messages that represent L serially working variable nodes. The $N_v$ VNUs work in a parallel manner. However, inside every VNU, the L variable nodes are processed serially. Likewise, the $M_c$ CNUs work in parallel with every CNU containing L serially working check nodes.

To better explain the mechanism for the memory bank 340, it should be noted that the VNU blocks 300 use the memory bank 340. Each RAM block 345 is associated with an address generator (AG) which provides the reading and writing addresses and each RAM block 345 is used to store exchanged messages between variable nodes in the VNUs and the check nodes in the CNUs.

The behaviour of the partially parallel decoder architecture is divided into two main phases:
  Loading phase: The intrinsic messages associated with all of the variable nodes are loaded into the RAM (random access memory) of the VNUs.
  Iterative decoding phase: Each iteration is comprised of one CNU and one VNU operation.

During the CNU operation, messages are fetched from the VNU RAM one by one and passed to the CNUs through the routing network and the memory bank. The CNUs then process the check nodes and store the results back to the VNU RAM. For each VNU operation, messages are taken out from the RAM to perform the variable node computation. When the computation is completed, the results are stored back to the RAM. The CNU and VNU operations are processed iteratively. By the end of each iteration, the check stop criterion in the algorithm is performed to check if the correct codeword has been reached. If the correct codeword has been found, the iterations then stop. Otherwise, the iterations continue executing until the maximum number of iterations has been reached.

In this architecture, each VNU and CNU contains L serially-processed variable and check nodes, respectively. Consequently, at least L clock cycles are needed to complete one VNU or CNU operation. Assuming that the clock speed is $f_{MHz}$, the maximum number of iterations is P, the code rate is R, and, ignoring the time taken by the loading process and the output process, the throughput of the partially parallel decoder can be presented as $$Y_{throughput} = \frac{NRf}{2LP} Mbps.$$

It should be noted that, since H is fixed, the code rate R and the codeword length N are fixed. Therefore, the $Y_{throughput}$ of the partially parallel structure is determined by the two parameters given in the denominator. Hence, in order to improve $Y_{throughput}$, either the value of L or P or both should be decreased.

For the user device transmitter, the following modulated data structure is used for communications between the host and user devices, as shown in FIG. 4 and in the following equation:

$$s_l = [\underbrace{x_l(N-P+1), \ldots, x_l(N-1)}_{prefix}, \underbrace{x_l(0), \ldots, x_l(i), \ldots, x_l(N-1)}_{N \text{ data symbols}}]^T. \quad (19)$$

The modulated data symbols in equation (19) are obtained by modulating and encoding the incoming data using the selected digital modulation scheme and error correcting code for uplink transmission.

From the above design, a cyclic prefix of P symbols is inserted before the transmission of N data symbols to protect the symbol from potential distortion due to the multipath channel.

Referring to FIG. 8 again, the turbo encoder for the user device is illustrated as part of the system. The turbo encoder consists of two RSC (RISC single chip) components 350A, 350B separated by an interleaver 355. This interleaver will be a shared resource between the turbo encoder and the LDPC decoder. Within the interleaver itself, a multiplexer is reused to multiplex the output from the two RSC components as well as the original data to produce the rate ⅓ turbo code. Also part of the memory bank 340, there are two memory resources 360A, 360B reserved for the turbo encoder. One of these memory resources is used to store the data until the RSC components 350A, 350B finish their processes. Once done, the data is sent from the RSC components to the multiplexer in the interleaver. The other memory resource is used to partially store the data before it is sent to the RSC1. The stored time is the same time taken until the interleaver finishes its process before it sends its output to RSC2.

As discussed above, channel and carrier frequency offset estimations have to be realized before pre-equalization and pre-synchronization can be performed at the host transmitter. The accuracy of such estimations is crucial to the performance of the overall system in terms of bit/symbol error rate at the user device side. The joint maximum likelihood (ML) estimation of frequency offset and channel impulse response is described below.

Regarding the joint estimation of the frequency offset and the channel impulse response by the host device receiver, one can begin by considering a preamble vector a with length N, i.e., the duration of one communication block. The preamble is also extended by a cyclic prefix of length P, the details of which will be discussed below. This preamble will be transmitted by the transmitter of the user device to the receiver of the host device for channel impulse response and frequency offset estimation purpose. If the intersymbol interference is completely mitigated by the cyclic prefix (CP), the received preamble vector y after CP removal can be expressed as $$y = \Gamma(\Delta k) A h + w \quad (20)$$

where $\Delta k$ represents the relative frequency offset and $\Gamma(\Delta k)$ is a diagonal matrix:

$$\Gamma(\Delta k) = \text{diag}\{1, e^{j2\pi\Delta k/N}, e^{j4\pi\Delta k/N}, \ldots, e^{j2\pi(N-1)\Delta k/N}\} \quad (21)$$

and A is N×P matrix with entries $$[A]_{i,j} = a_{i-j}, \ 0 \le i \le N-1, \ 0 \le j \le P-1. \quad (22)$$

In equation (20), the matrix $w = [w(0), w(1), \ldots, w(N-1)]^T$ is a zero-mean Gaussian vector. Thus, the conditional likelihood function of the received signal given the channel and the frequency-offset, $(h, \Delta k)$, takes the form of:

$$\Lambda(y \mid h, \Delta k) = \frac{1}{(\pi \sigma_n^2)^N} \exp\left\{-\frac{1}{\sigma_n^2}\{[y - \Gamma(\Delta k) A h]^H [y - \Gamma(\Delta k) A h]\}\right\}. \quad (23)$$

This provides that the maximum likelihood channel estimate is $$\hat{h} = (A^H A)^{-1} A^H \Gamma^H(\Delta k) y. \quad (24)$$

By substituting $\hat{h}$ back into $\Lambda_L(y|h, \Delta k)$, it is found that maximizing the likelihood function, $\Lambda_L(y|h, \Delta k)$, is equivalent to maximizing $$\xi(\Delta k) = y^H \Gamma(\Delta k) B \Gamma^H(\Delta k) y \quad (25)$$

where $B = A(A^H A)^{-1} A^H$. The carrier frequency offset estimator can be formulated as $$\Delta \hat{k} = \underset{\Delta k}{\text{argmax}}\{\xi(\Delta k)\}. \quad (26)$$

It should be noted that the optimal solution for Equation (26) can be obtained by adopting an appropriate search strategy. In one implementation, the well-known gradient search algorithm (GSA) could be used to find the optimal frequency offset $\Delta k$. This can be done by letting $\Delta k^{(i)}$ be the frequency offset estimate at iteration i of the GSA and letting $G(\Delta k^{(i)})$ be the corresponding gradient at iteration i of the GSA. The frequency estimate used in the (i+1) iteration is $$\Delta k^{(i+1)} = \Delta k^{(i)} + \delta \cdot G(\Delta k^{(i)}),$$

where $\delta$ is the step-size of the GSA search. $\Delta k^{(i+1)}$ can then be used to compute the new gradient and this process continues until convergence occurs.

It is known in the literature to exploit the structure of the preamble of a communication system to reduce the complexity of the frequency offset estimator. A similar approach is used by considering a similar training sequence as shown in FIG. 5. Referring to FIG. 5, there is an even number, L, of repetitive slots (RS) within each preamble. The selection of the number of identical slots is a trade-off between the frequency offset estimation accuracy, the frequency offset estimation range, and the channel estimation accuracy.

With the estimated value $\Delta \hat{k}$, the frequency offset in the received signal can be compensated for before the channel impulse response estimation. By doing so, the impact of the frequency offset to the channel estimation reduces to the residual frequency offset $\Delta k - \Delta \hat{k}$. The compensation process is equivalent to a shift to the received signal by $-\Delta \hat{k}$ in the frequency domain. This starts by letting y' be the vector of the received signal after the removal of the estimated frequency offset:

$$Y'=\Gamma(-\Delta\hat{k})y \quad (27)$$

where $$\Gamma(-\Delta\hat{k})=\text{diag}\{1,e^{-j2\pi\Delta\hat{k}/N},e^{-j4\pi\Delta\hat{k}/N},\ldots,e^{-j2\pi(N-1)\Delta\hat{k}/N}\}. \quad (28)$$

When the frequency offset estimation error is small, the diagonal matrix with the residual frequency offset becomes $$\Gamma(\Delta k-\Delta\hat{k})\approx\text{diag}\{1,1,1,\ldots,1\}=I_N. \quad (29)$$

The channel impulse response can now be estimated using the simplified estimator as $$\hat{h}\approx(A^HA)^{-1}A^Hy'. \quad (30)$$

To reduce maximum likelihood estimation (MLE) complexity, $(A^HA)^{-1}A^H$ can be pre-calculated and stored. In this case, only N×P complex multiplications are needed (one complex multiplication corresponds to four real multiplications and two real additions).

Numerical simulations using MATALB has been carried out to evaluate the performance of the asymmetrical transceiver according to one aspect of the invention. The purpose of the simulations presented here is to determine the average Symbol error rate (SER) and bit error rate (BER) of the system as well as of the coding schemes.

Figure 9:
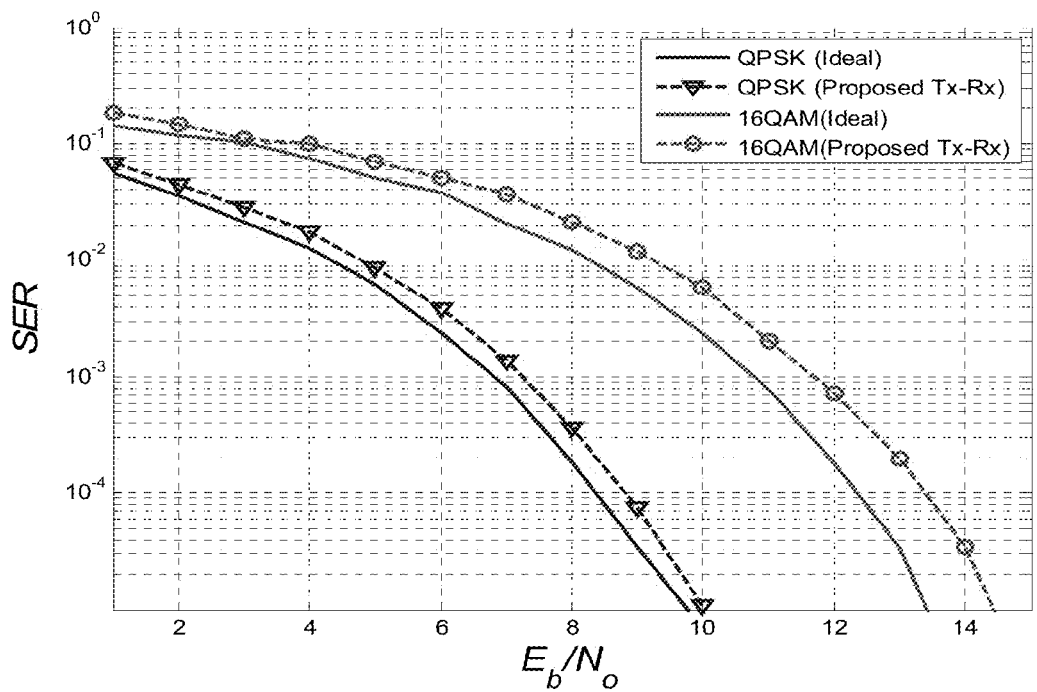
FIG. 9 is a plot of a simulated symbol error rate (SER) performance of an implementation of the present invention.

FIG. 9 illustrates the SER comparison between the system described above and ideal scenarios using QPSK and 16-QAM. In addition, the used channel in this simulation is h=[1.0 0 0 0 0 0 ] and carrier frequency offset=0.0.

Figure 10:
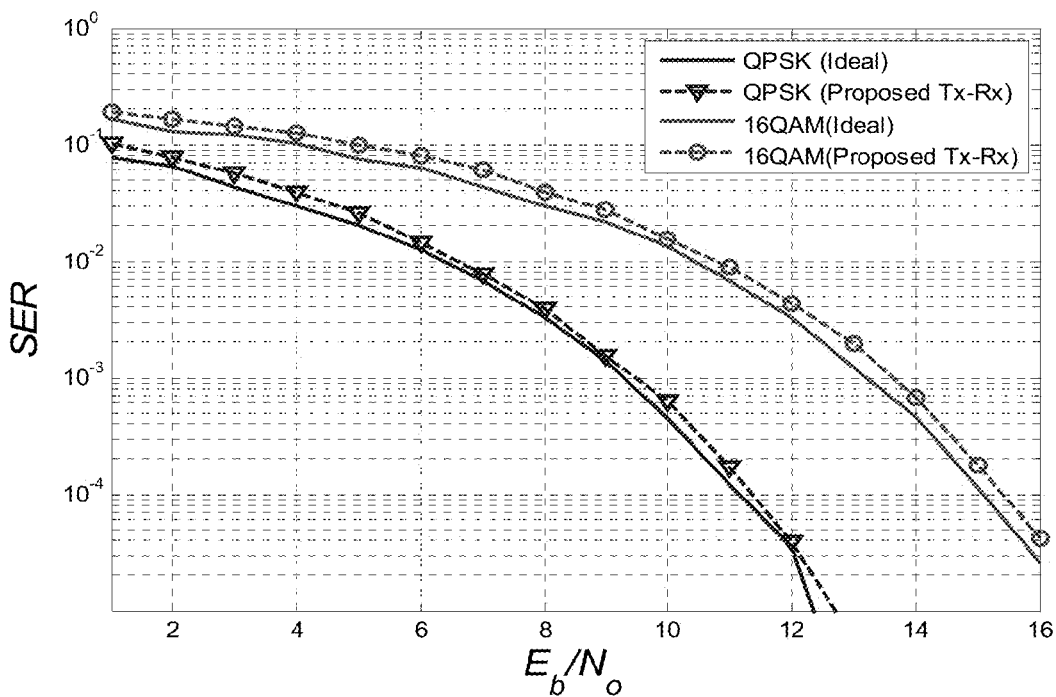
FIG. 10 is another plot of another simulated symbol error rate (SER) performance of an implementation of the present invention using parameters different from that used to generate the results in FIG. 9.

FIG. 9 confirms the effectiveness of the Tx-Rx transceiver described above. Performance degradation due to pre-equalization and pre-synchronization is minimal. When compared to ideal system with performance channel knowledge, performance degradation is only around 0.3 dB at SER $10^{-4}$. However, using the above described schemes of error correcting code, this loss of performance is compensated for. Referring to FIG. 10, the results of a comparison between the inventive system and ideal scenarios using QPSK and 16-QAM are illustrated. The same parameters as were used for the comparison in FIG. 9 were used but with the used channel being h=[0.9285 0 0.3714 0 0 0] and the carrier frequency offset is 0.03.

Figure 11:
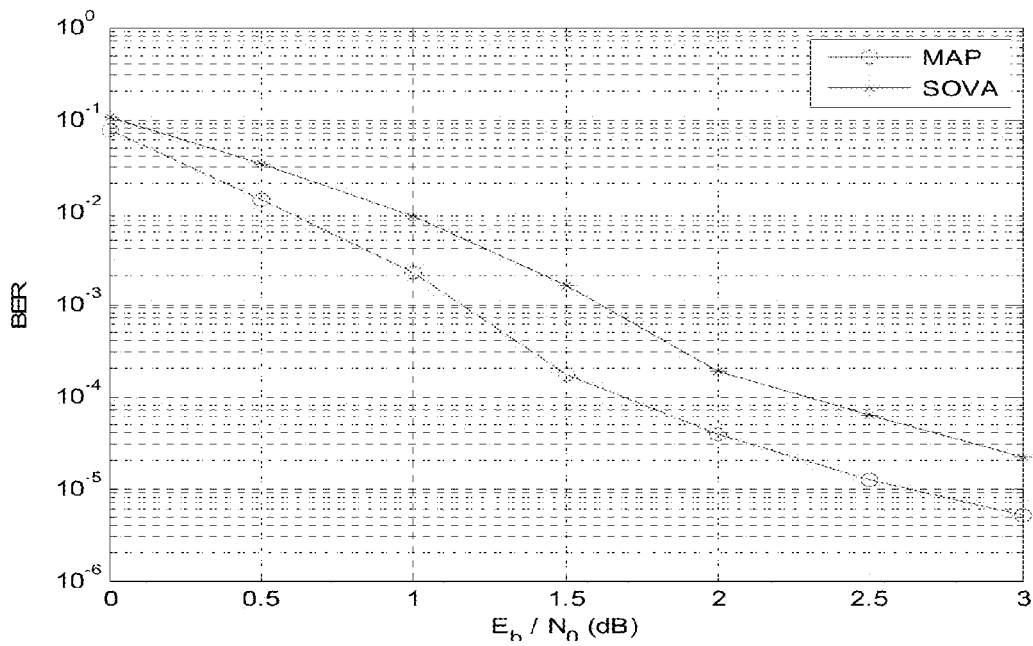
FIG. 11 is a plot of bit error rate (BER) performance by simulation of the MAP/SOVA algorithms.

The BER performance of the MAP and SOVA algorithms was determined by simulation for a rate ⅓, 16-state, interleaver length 400-bit turbo code over the AWGN channel, after 15 decoding iterations using a generator polynomial G={111, 101}. Random interleavers were used in the turbo coding process initially. The results are shown in FIG. 11. FIG. 11 shows that the SOVA algorithm exhibits a BER performance which is ≈0.8 dB poorer than this at middle values of $E_b/N_o$. This is a similar margin to that shown by other researchers. For this reason, the MAP algorithm is taken as the default algorithm in the invention.

Figure 12:
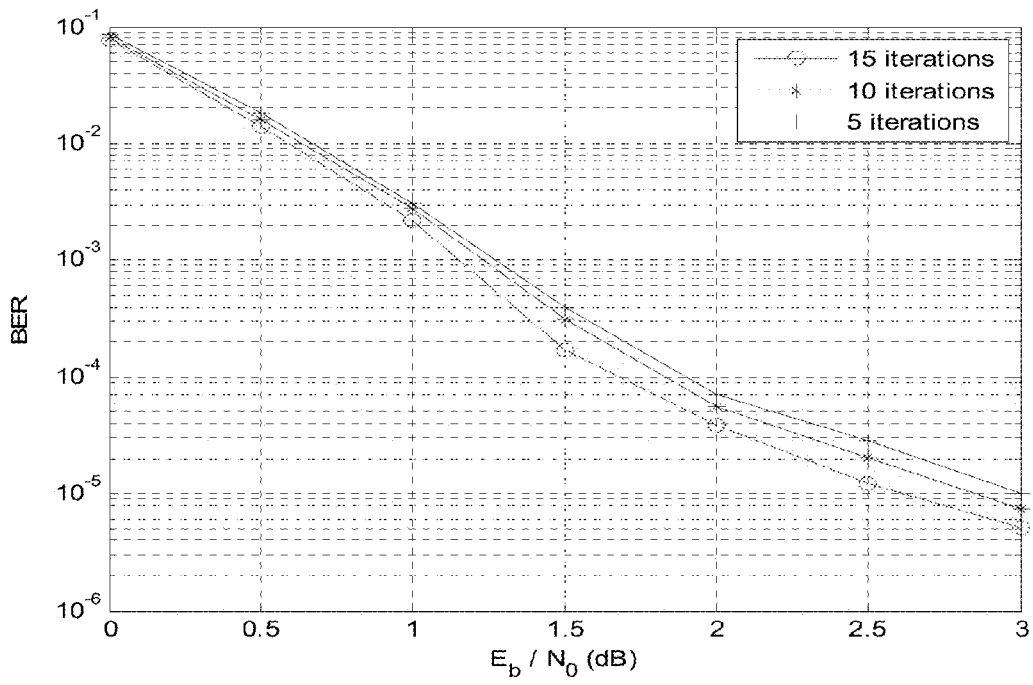
FIG. 12 is a plot of bit error rate (BER) performance by simulation of the MAP algorithms.

FIG. 12 shows the performance of a turbo decoder using the MAP algorithm comparing the number of decoding iterations. This simulation shows that increasing the number of iterations gives better performance. However, the MAP algorithm achieves soft decision decoding on a bit-by-bit basis by making two passes over the decoding trellis and this approach is time consuming. For the simulation used to generate the results in FIG. 12, the frame size used was 400, the rate was ⅓, K=3 over an AWGN channel (15, 10, and 5 iterations) and the generator polynomial G={111,101} was used.

To evaluate the belief propagation algorithm, simulations were performed for the BP decoding algorithm to decode the LDPC code, assuming an AWGN channel and BPSK modulation.

Figure 13:
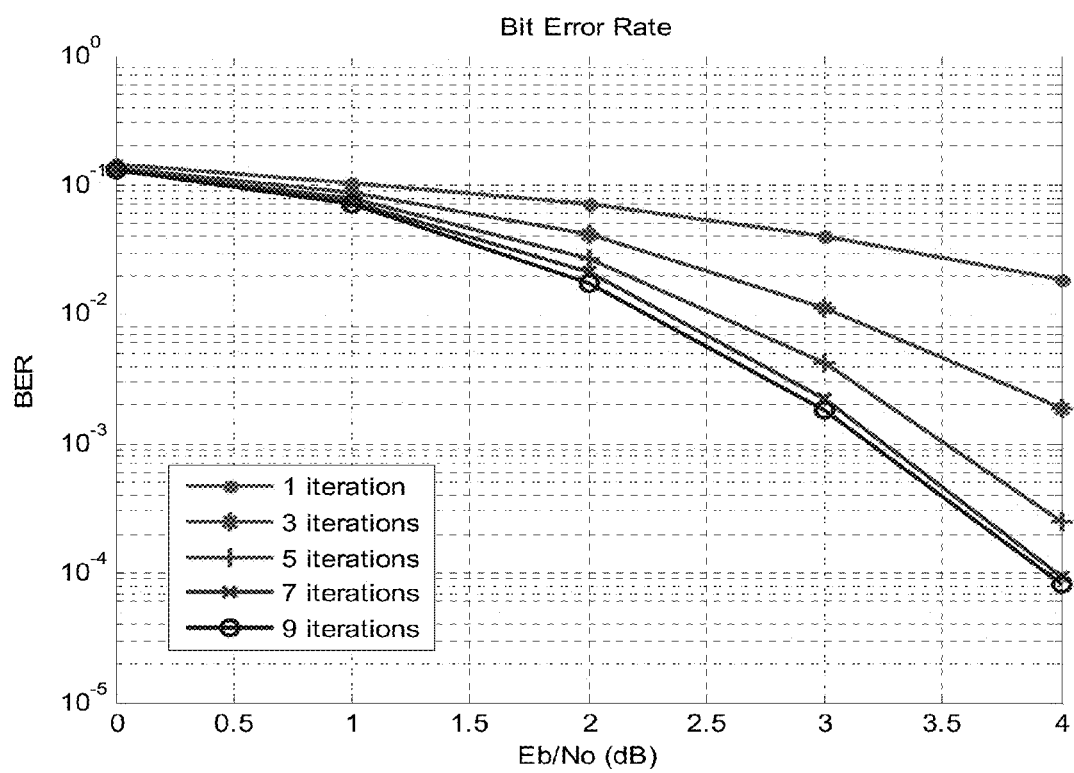
FIG. 13 is a plot of bit error rate (BER) performance of the BP algorithm by simulation.

The BER performance of the BP algorithm was determined by simulation for a 128×256 regular (3, 6) LDPC code over the AWGN channel and different numbers of decoding iterations. The performance in terms of BER for an irregular LDPC decoder using the BP algorithm versus the number of decoding iterations is shown in FIG. 13. For FIG. 13, the simulation used 1, 3, 5, 7 and 9 iterations.

It should be noted that the various aspects of the invention described above may give rise to a number of variants, a number of which are described below.

As noted above, the present invention relates to an asymmetrical transceiver design for short range communications. The design is one where the host device and the user devices have different transmitter and receiver architectures and, hence, different implementation complexities. In the design, the host device pre-compensates for non-ideal signal propagation distortions on behalf of the user devices.

The host device can be associated with multiple user devices at the same time through time sharing of the channel. Each user device can be assigned a unique identification number for addressing purposes. The uplink and downlink communications between the host device and the user device are achieved based on time division duplexing. This is performed such that the channel reciprocity can be achieved for pre-equalization and pre-synchronization at the host device side of the system.

The transmission format for the short-range communications system is block based transmission, with an inserted redundant cyclic prefix to protect the data from inter-symbol interferences.

In this short-range communications system, the host transmitter will collect the channel information from the local host receiver and will apply pre-equalization to any signal to be transmitted to user devices. The pre-equalization pre-compensates for channel distortions. Because of this, no additional equalization is required by the user devices.

With respect to synchronization, the host transmitter will collect synchronization error information from the local host receiver and will pre-synchronize (or apply pre-synchronization to) any signal to be transmitted to a user device. The pre-synchronization will pre-compensate for the carrier frequency offset and the timing offset. Because of this, no additional synchronization is required at the user device.

It should be noted that the invention may be used in various environments. When used in fixed wireless communications, the channel estimation error and carrier frequency offset estimation can be improved through multiple observations at different times. When used in a mobile scenario with channel variation, channel variation can be predicted using the past channel estimates such that the predicted channel used for pre-equalization at the host transmitter will be approximately the same as the channel encountered during the signal propagation process.

When used in a scenario with varying carrier frequencies, the invention may use a variant where the carrier frequency offset (CFO) can be predicted based on previous CFO estimates such that the CFO used when determining pre-compensation at the host transmitter will approximately be the CFO used during the transmission process.

As another variant, the transceiver design may use share receive and transmit equalizer coefficients. This means that the equalizer coefficients used in the host receiver will be sent to the host transmitter for pre-equalization purposes. The host transmitter related pre-equalization will thus be significantly simplified. In addition, the transceiver design may also share receive and transmit synchronization matrices. This means that the equalizer coefficient used in the host receiver will be sent to the host transmitter for pre-synchronization purposes. Again, the host transmitter related pre-synchronization will be significantly simplified.

It should be noted that an asymmetrical protocol may be designed such that the user device just needs to follow up on instructions from the host device without requiring any further processing. The interaction mechanisms between the host device and the user device will be completely determined by the host device using the asymmetrical protocol based on the channel conditions, device distortions, requirements of the user device, and overall traffic conditions from other co-existing user devices.

The present invention may also use a supporting mechanism for multiple devices by way of transmitter identification assignment and addressing. As well, the invention may use a master initiated calibration process (i.e. a signal propagation delay estimation) to estimate the channel and device distortion when preparing the pre-equalization and pre-synchronization coefficients.

Another part of the invention may use asymmetrical error correction code schemes with lower user device complexity. These error correction code schemes would be based on the utilization of lesser complexity encoders and decoders at the user device side when compared to the host side. For such error correction code schemes, the host side would have a powerful encoders and decoders. The error correction coding schemes could have one more similar or different channel codes concatenated in parallel or in series and separated by interleavers.

It should be noted that in the description given above, the LDPC codes encoder is based on the pipeline parallel approach and the LDPC decoder is based on the BP algorithm. Any other Tanner graph based decoders could also be used to decode the LDPC code.

It should further be noted that, for clarity, the communications process between the host device and the user device may be understood to encompass the steps described below. For the host transmission, the process begins with the reception of a preamble transmission from the user device transmitter. This preamble transmission contains a preamble as described above and may be sent from the user device either upon a prompt, e.g. a coordination action by the host device, from the host device or automatically without any coordination with the host device. The preamble is preferably predetermined. Once the preamble has been received by the host device receiver, the host device receiver can then estimate the channel impulse response as well as the channel frequency offset per the above description. The estimation of these parameters are then sent from the host device receiver to the host device transmitter. The host device transmitter can then receive the data to be transmitted. The data to be transmitted to the user device is then encoded using the downlink modulation scheme and error correcting code per the above description. At least one pre-transmission process, based on the estimates received from the host device receiver, is then applied to the data. The pre-transmission process is applied to compensate for distortions expected to be encountered by the data due to the channel and/or devices used. The pre-transmission process can include pre-synchronization and pre-equalization. Once the downlink error correction code and the pre-transmission process have been applied, the data can be transmitted from the host device transmitter to the user device receiver.

For the user device, the transmission process is simpler as it begins with determining the transmission time based on the instruction from the host device through a higher layer of the network protocol. The data to be transmitted is then received and the uplink error correction code and modulation are applied. Finally, the encoded data is transmitted from the user device transmitter to the host device receiver.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for asymmetrical wireless communications between a host device and a user device, the method comprising:

at said host device:
  a) receiving a preamble transmission from a transmitter of said user device, said preamble transmission containing a predetermined preamble from said user device;
  b) using said predetermined preamble to determine communications parameters for a single channel used in communicating between said host device and said user device, said step being executed by a receiver on said host device;
  c) receiving downlink data to be transmitted to said user device;
  d) selecting a downlink error correcting code and an uplink error correcting code;
  e) applying said downlink error correcting code to said downlink data;
  f) applying at least one pre-transmission process to said encoded downlink data to result in pre-processed data, said at least one pre-transmission process being for compensating for potential distortions due to said single channel and due to a lower hardware complexity of said user device, said at least one pre-transmission process being based on communications parameters determined in step b);
  g) transmitting said pre-processed data to said user device using said single channel; and
at said user device:
  h) applying said uplink error correcting code to uplink data, said encoded uplink data being for transmission from said user device to said host device;
  wherein:
  steps a)-g) are executed by said host device and step h) is executed by said user device;
  said uplink error correcting code applied to uplink data is different from said downlink error correcting code applied to downlink data in step e);
  said user device is lower in hardware complexity when compared to said host device;
  said host device determines uplink transmission parameters;
  said method is for two-way data wireless communications between said host device and said user device;
  said downlink error correcting code has a higher encoder complexity and a lower decoder complexity than said uplink error correcting code; and
  said applying at least one pre-transmission process in step f) further includes a pre-synchronization process and a pre-equalization process being applied to said encoded downlink data to result in said pre-processed data.

2. A method according to claim 1, wherein step b) comprises estimating a carrier frequency offset due to a frequency offset source, said frequency offset source being said user device.

3. A method according to claim 1, wherein step b) comprises estimating a channel impulse response for said single channel.

4. A method according to claim 1, wherein said pre-synchronization process being for compensating for potential carrier frequency offset in said single channel due to said lower hardware complexity of said user device.

5. A method according to claim 1, wherein said pre-equalization process being for compensating for potential channel distortions due to said single channel.

6. A method according to claim 1, wherein said downlink error correcting code is a Low Density Parity Check (LDPC) code.

7. A method according to claim 1, wherein said uplink error correcting code is a turbo code.

8. A method according to claim 1, wherein said host device and said user device use time division duplexing to communicate with each other.

9. A method according to claim 1, wherein said host device and said user device communicate with each other using block based transmission, each block in said block based transmission including at least one redundant cyclic prefix.

10. A method according to claim 1, wherein each data packet for communicating between said host device and said user device includes a preamble section, said preamble section including a predetermined even number of repetitive slots.

11. A method according to claim 1, wherein said preamble is transmitted by said user device in response to coordination from said host device.

12. A method according to claim 1, wherein said preamble is transmitted to said host device in a self-initiated manner.

13. A method according to claim 1, wherein said at least one pre-transmission process is for compensating for potential issues due to said user device.

14. A method for asymmetrical wireless communications between a host device and a user device, the method comprising:
at said user device:
  a) determining a transmission time between said user device and said host device based on an instruction from said host device to said user device;
  b) receiving uplink data to be transmitted from said user device to said host device;
  c) applying an uplink error correcting code to said uplink data;
  d) transmitting said encoded uplink data from a user device transmitter to a host device receiver using a single channel; and
at said host device:
  e) applying a downlink error correcting code to downlink data;
  f) applying a pre-synchronization process and a pre-equalization process to said encoded downlink data to result in said pre-processed data in order to compensate for potential distortions due to said single channel and due to a lower hardware complexity of said user device;
  g) transmitting said pre-processed data to said user device by way of said single channel;
  wherein
  steps a)-d) are executed on said user device and steps e)-g) are executed on said host device;
  said uplink error correcting code applied to said uplink data is different from a downlink error correcting code applied to said downlink data, said uplink error correcting code having a lower encoder complexity and a higher decoder complexity than said downlink error correcting code;
  said user device is lower in hardware complexity when compared to said host device;
  said host device determines uplink transmission parameters; and
  said method is for two-way data wireless communications between said host device and said user device.

15. A method according to claim 14, wherein said downlink error correcting code is a Low Density Parity Check (LDPC) code.

16. A method according to claim 14, wherein said uplink error correcting code is a turbo code.

17. A method according to claim 14, wherein said host device and said user device use time division duplexing to communicate with each other.

18. A method according to claim 14, wherein said host device and said user device communicate with each other using block based transmission, each block in said block based transmission including at least one redundant cyclic prefix.

19. A method according to claim 14, wherein each data packet for communicating between said host device and said user device includes a preamble section, said preamble section including a predetermined even number of repetitive slots.

20. A system for short range wireless communications the system comprising:
  a host device for communicating with a user device,
  said host device being configured for:
    receiving a preamble transmission from a transmitter of said user device, said preamble transmission containing a predetermined preamble from said user device;
    using said predetermined preamble to determine communications parameters for a single channel used in communicating between said host device and said user device;
    receiving downlink data to be transmitted to said user device;
    selecting a downlink error correcting code and an uplink error correcting code;
    applying said downlink error correcting code to said downlink data;
    applying at least one pre-transmission process to said encoded downlink data to result in pre-processed data, said at least one pre-transmission process being for compensating for potential distortions due to said single channel and due to a lower hardware complexity of said user device, said at least one pre-transmission process being based on the determined communications parameters; and
  said user device wherein
  said user device is configured for applying said uplink error correcting code to uplink data, and said encoded uplink data being for transmission from said user device to said host device;
  further wherein:
  said uplink error correcting code applied to uplink data is different from said downlink error correcting code applied to downlink data;
  said user device is lower in hardware complexity when compared to said host device;
  said host device determines uplink transmission parameters;
  said downlink error correcting code has a higher encoder complexity and a lower decoder complexity than said uplink error correcting code; and
  said applying at least one pre-transmission process further includes the host device being configured for applying a pre-synchronization process and a pre-equalization process to said encoded downlink data to result in said pre-processed data.

21. A system according to claim 20, wherein said uplink error correcting code has a lower encoder complexity and a higher decoder complexity than said downlink error correcting code.

22. A system according to claim 20, wherein said host device includes a common encoder/decoder.

23. A system according to claim 22, wherein said common encoder/decoder is a combined turbo decoder/LDPC encoder.

24. A system according to claim 20, wherein said user device includes a common encoder/decoder.

25. A system according to claim 24, wherein said common encoder/decoder is a combined LDPC decoder/turbo encoder.

26. A system according to claim 20, wherein said pre-synchronization process being for compensating for potential carrier frequency offset due to said user device.

27. A system according to claim 20, wherein said pre-equalization process being for compensating for potential channel distortions due to said user device.

28. A system according to claim 20, wherein said downlink error correcting code is a Low Density Parity Check (LDPC) code.

29. A system according to claim 20, wherein said uplink error correcting code is a turbo code.

30. A system according to claim 20, wherein said host device and said user device use time division duplexing to communicate with each other.

31. A system according to claim 20, wherein said host device and said user device communicate with each other using block based transmission, each block in said block based transmission including at least one redundant cyclic prefix.

* * * * *